United States Patent
Rosen

[11] Patent Number: 5,946,055
[45] Date of Patent: Aug. 31, 1999

[54] DISPLAY UNIT

[75] Inventor: John B. Rosen, Eugene, Oreg.

[73] Assignee: Rosen Product Development, Inc., Eugene, Oreg.

[21] Appl. No.: 08/884,445

[22] Filed: Jun. 27, 1997

[51] Int. Cl.[6] .................................................. H04N 5/64
[52] U.S. Cl. ........................ 348/837; 312/7.2; 224/311
[58] Field of Search ................... 312/7.2, 248; 248/923; 224/311; 348/837; 296/37.8; 361/681, 726; 345/905; 455/345

[56] References Cited

U.S. PATENT DOCUMENTS

| | | |
|---|---|---|
| D. 294,495 | 3/1988 | Nissley . |
| 4,195,431 | 4/1980 | Neufeld . |
| 4,438,458 | 3/1984 | Münscher . |
| 4,504,910 | 3/1985 | Araki et al. . |
| 4,620,808 | 11/1986 | Kurtin et al. . |
| 4,630,821 | 12/1986 | Greenwald . |
| 4,633,323 | 12/1986 | Haberkern et al. . |
| 4,647,980 | 3/1987 | Steventon et al. . |
| 4,708,312 | 11/1987 | Rohr . |
| 4,735,467 | 4/1988 | Wolters . |
| 4,742,478 | 5/1988 | Nigero, Jr. et al. . |
| 4,749,364 | 6/1988 | Arney et al. . |
| 4,836,486 | 6/1989 | Vossoughi et al. . |
| 4,843,477 | 6/1989 | Mizutani et al. . |
| 4,866,515 | 9/1989 | Tagawa et al. . |
| 4,870,676 | 9/1989 | Lewo . |
| 4,883,242 | 11/1989 | Becker et al. . |
| 4,915,461 | 4/1990 | Kingsborough et al. . |
| 4,982,996 | 1/1991 | Vottero-Fin et al. . |
| 4,983,951 | 1/1991 | Igarashi et al. . |
| 4,995,680 | 2/1991 | Miruri . |
| 5,021,922 | 6/1991 | Davis et al. . |
| 5,076,524 | 12/1991 | Reh et al. . |
| 5,096,271 | 3/1992 | Portman ................................... 312/7.2 |
| 5,144,290 | 9/1992 | Honda et al. . |
| 5,161,028 | 11/1992 | Kawata et al. . |
| 5,173,686 | 12/1992 | Fujihara . |
| 5,177,616 | 1/1993 | Riday . |
| 5,179,447 | 1/1993 | Lain . |
| 5,195,709 | 3/1993 | Yasushi . |
| 5,311,302 | 5/1994 | Berry et al. . |
| 5,333,416 | 8/1994 | Harris et al. .............................. 312/7.2 |
| 5,335,076 | 8/1994 | Reh et al. . |
| 5,338,081 | 8/1994 | Young et al. . |
| 5,359,349 | 10/1994 | Jambor et al. . |
| 5,362,144 | 11/1994 | Shioya et al. . |
| 5,397,160 | 3/1995 | Landry . |
| 5,467,106 | 11/1995 | Salomon . |
| 5,547,248 | 8/1996 | Marechal . |
| 5,583,735 | 12/1996 | Pease et al. .............................. 312/7.2 |
| 5,743,487 | 4/1998 | Rice ........................................ 312/7.2 |

FOREIGN PATENT DOCUMENTS

| | | |
|---|---|---|
| 4118711 | 12/1992 | Germany . |
| 4118711 A1 | 12/1992 | Germany . |
| 2-7082 | 1/1990 | Japan . |
| 5050883 | 3/1993 | Japan ..................................... 224/311 |

*Primary Examiner*—Peter M. Cuomo
*Assistant Examiner*—Gerold A. Anderson
*Attorney, Agent, or Firm*—Kolisch, Hatwell, Dickinson, McCormack & Heuser

[57] ABSTRACT

A display unit is provided, the display unit including a housing configured for mounting in an interior region of a vehicle, and a screen mounted on the housing for movement between a stowed position wherein the screen is at least partially contained within the housing and a deployed position wherein the screen projects from the housing to reveal a viewing surface of the screen. When the screen is deployed, the viewing surface typically is at an angle of between approximately 45-degrees and 90-degrees from horizontal, promoting viewability of the screen.

28 Claims, 4 Drawing Sheets

DISPLAY UNIT

TECHNICAL FIELD

The present invention relates generally to display units, and more particularly, to a display unit configured for use in presenting a viewing surface to occupants of a vehicle.

BACKGROUND ART

Automotive manufacturers have long sought to make passengers as comfortable as possible during travel, focusing both on physical comfort and on the passenger's entertainment. For example, vehicle sound systems have become standard accessories in most cars and trucks. In recent years, efforts have involved attempts to bring video technology into the passenger compartment, either in the form of a television, a computer, or a video game display.

Unfortunately, display units have heretofore been impractical as automotive accessories due to problems in mounting conventional display units within a vehicle. One problem relates to the size of most display units, it being difficult to find space for a standard-size monitor in most vehicles. Another problem arises from difficulties in placing the display unit in a position where it may be viewed by a passenger, but will not obstruct the driver's view of the road. Still another problem involves the stowability of the display unit, and its corresponding effect on passenger safety.

Known display units also have been unable to meet consumer expectations due to difficulties in providing acceptable picture quality in a package of suitable size. However, with advancements in flat-panel display technology, picture quality of smaller display units has improved dramatically. Additionally, it has become possible to separate some of the electronic circuitry from the flat-panel display, further reducing the thickness of these displays. The present invention takes advantage of these improvements by providing a stowable display unit which is suited for mounting in an interior region of an automobile without compromising picture quality.

DISCLOSURE OF THE INVENTION

The aforementioned goals and objectives are met by provision of a display unit which includes a housing configured for mounting in an interior region of a vehicle, and a screen mounted on the housing for movement between a stowed position wherein the screen is at least partially contained within the housing and a deployed position wherein the screen projects from the housing to reveal a viewing surface of the screen. When the screen is deployed, the viewing surface typically is at an angle of between approximately 45-degrees and 90-degrees from horizontal, promoting viewability of the screen.

In one embodiment, the housing is mounted on the ceiling of the vehicle, typically near the center of the passenger compartment. The screen is mounted on the housing for pivot about a first axis which typically is defined along a predetermined edge of the screen. The screen pivots between a first orientation wherein the screen is generally horizontal (the stowed position), and a second orientation wherein the screen extends downwardly from the ceiling to present the screen's viewing surface to one or more vehicle occupants (the deployed position). The screen also may be pivotal about a second axis, transverse to the first axis, so as to enhance adaptability of the screen.

A cavity of predetermined shape and size is formed in the housing, the cavity being configured to at least partially contain the screen. This reduces the profile of the display unit when the unit is not in use. The profile may be reduced further by mounting the screen's control module separately from the screen, leaving a relatively thin pivotal screen. Where the cavity is embedded in the ceiling, the screen may be configured to retract entirely into the cavity such that the viewing surface is flush with the ceiling. This eliminates any impediment to the driver's view when the screen is in its stowed position.

The housing also may include a track, and a carriage which rides along the track to provide for deployment of the screen. In such an arrangement, the screen is mounted on the carriage for deployment first, by translation of the screen along the track from a first stowed position to an intermediate position, and second, by pivot of the screen about a first axis from the intermediate position to a deployed position. Again, the first axis preferably is defined along a predetermined edge of the screen.

Safety may be enhanced by provision of a break-away hinge which pivotally couples the screen with the housing to provide for emergency collapse of the screen. Such a screen preferably is pivotal in a forward direction between the stowed position and the deployed position under a first torque so as to deploy the screen, and is further pivotal in the forward direction between the deployed position and a break-away position under a higher second torque.

These and other objects and advantages of the present invention will be more readily understood after a consideration of the drawings and the detailed description of the preferred embodiment which follows.

DETAILED DESCRIPTION OF THE PREFERRED EMBODIMENT AND BEST MODE OF CARRYING OUT THE INVENTION

Referring initially to FIGS. 1 through 4, a display unit is shown for use in an interior region of a land vehicle 10, such display unit being indicated generally at 12. Although the invention has broad utility, the display unit is shown mounted on the ceiling 10a of the vehicle, preferably overhead and generally forward of the of the passenger seating area 14 so as to accommodate viewing thereof by one or more rear-seat passengers P.

Figure 1:
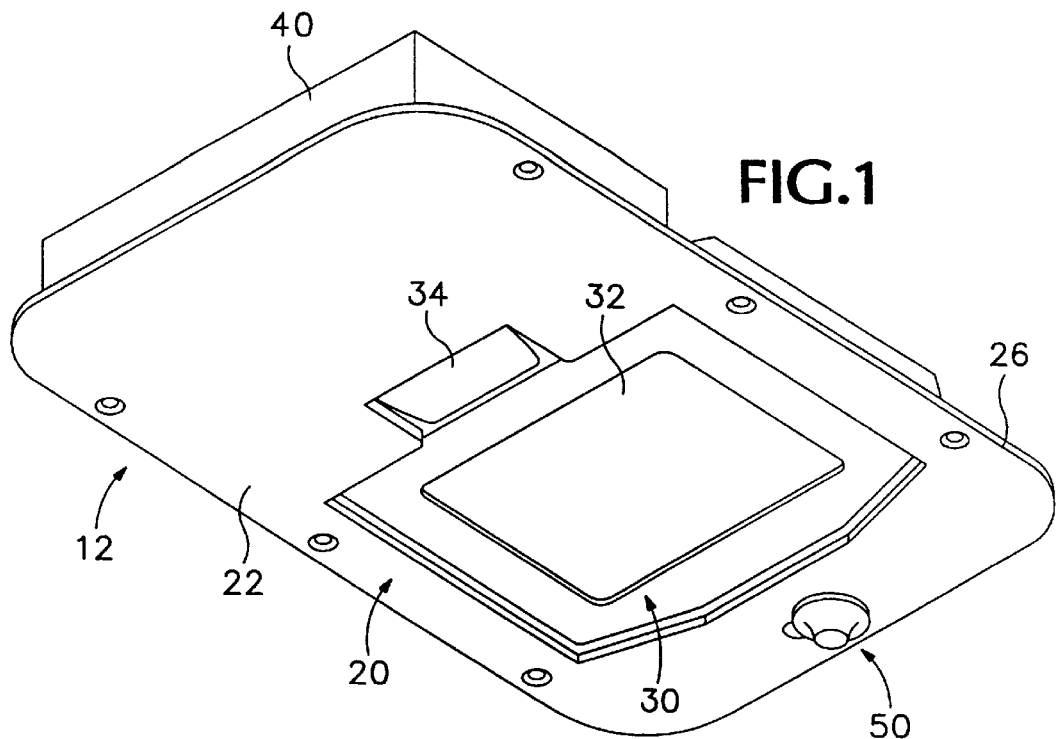
FIG. 1 is an isometric view of a display unit constructed in accordance with the preset invention, the display unit including a screen shown in a stowed position.
Figure 2:
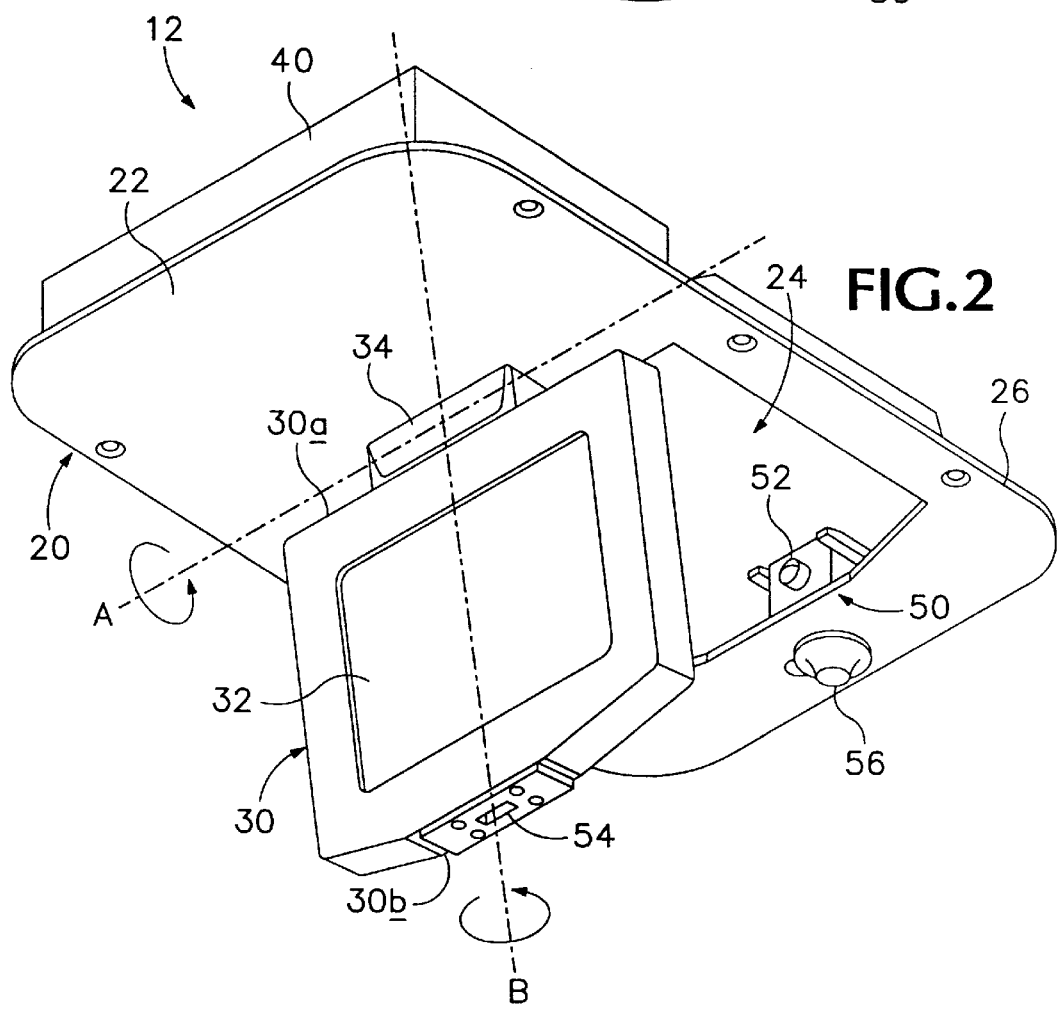
FIG. 2 is an isometric view similar to that of FIG. 1, but with the screen pivoted to a deployed position.
Figure 3:
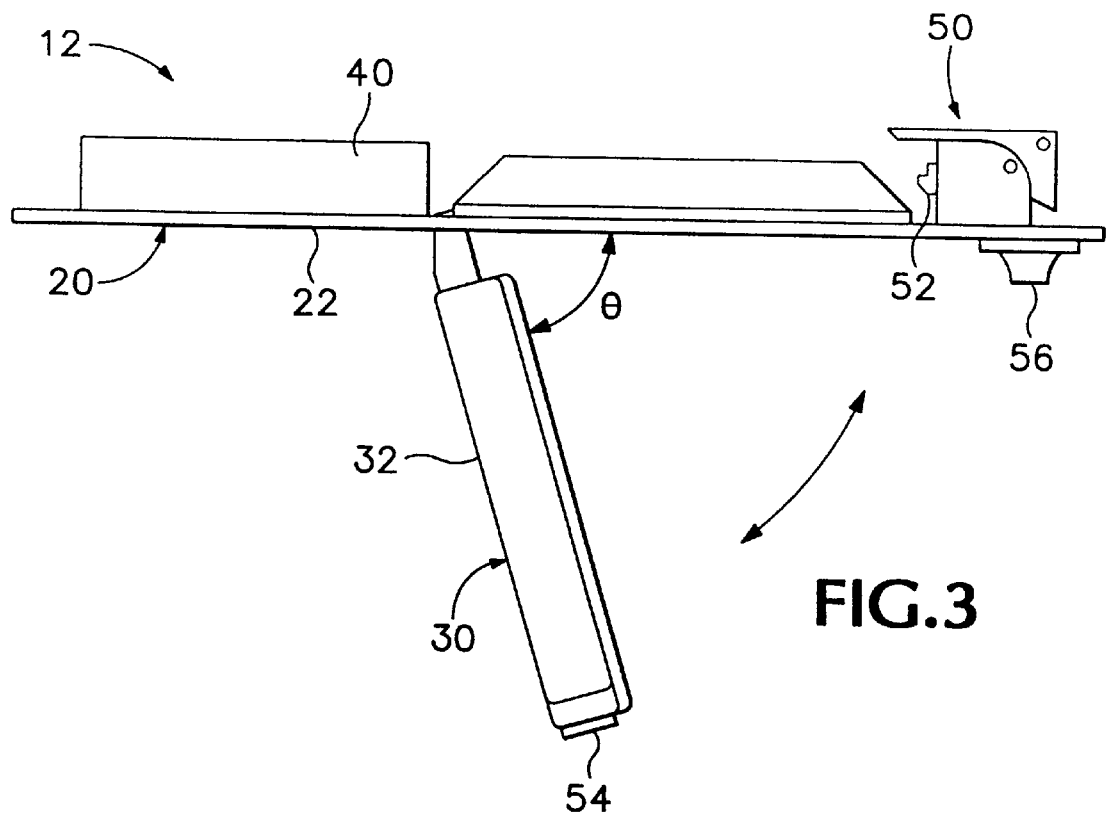
FIG. 3 is a side view of the display unit shown in FIGS. 1 and 2.
Figure 4:
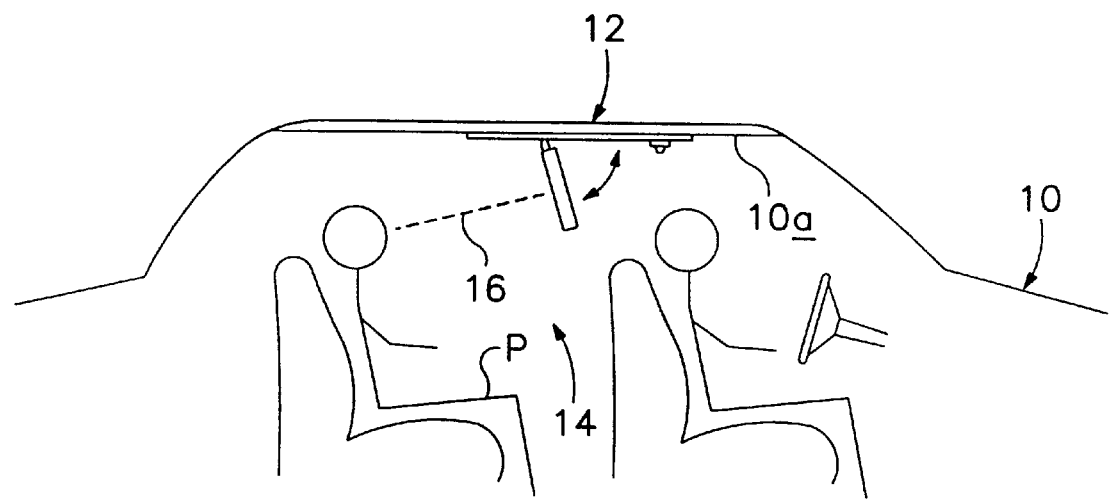
FIG. 4 is a somewhat simplified side view of a vehicle interior illustrating use of the display unit depicted in FIGS. 1, 2 and 3.

The display unit includes a generally planar mounting frame structure in the form of a housing 20, and a corresponding screen 30, which is mounted on the housing for movement between a stowed position (FIG. 1) and a deployed position (FIG. 2). In the stowed position, the screen is contained within the housing, a viewing surface 32 thereof typically facing downward into the passenger compartment. In the deployed position, the screen projects from the housing to present the screen's viewing surface to rear-seat passenger P. The screen's viewing surface thus selectively is placed in the rear-seat passenger's line-of-sight 16.

In accordance with my teachings, housing 20 will be seen to include a perimeter structure 22 having a proximal portion closer to the passenger seating area and a distal portion more remote from the passenger seating area. The housing defines a cavity 24 configured to receive the screen when the screen is placed in its stowed position. The cavity is of predetermined shape and size, typically conforming substantially to the shape and size of the viewing screen. It will be noted in FIGS. 1 and 2, for example, that cavity 24 is configured to accommodate fitted receipt of screen 30 such that the screen is fully contained within the cavity.

The housing typically is embedded in the ceiling, the vehicle being provided with a ceiling recess configured for receipt of the housing. Accordingly, the perimeter structure includes a generally planar flange 26 which may be secured to the ceiling via conventional fasteners such as screws. The flange is configured to conform to the contour of the ceiling, and preferably defines the lowermost surface of the housing. The housing thus may be flush-mounted with the ceiling. Furthermore, when the screen is in its stowed position with the screen contained within the cavity, the screen's viewing surface is flush with the flange, and correspondingly, is flush with the vehicle's ceiling.

In the depicted embodiment, the screen is separated from a video control module 40 which directs operation of the screen. The control module typically is mounted on the perimeter structure beside the screen and is connected to the screen via a ribbon wire or the like. This keeps the display unit relatively thin. In the depicted embodiment, for example, the display unit is approximately ½-inch to 1½-inches thick.

As indicated, viewing screen 30 is hinged to the housing adjacent the distal portion thereof to accommodate reversible swaying thereof in an upright plane which extends both through the housing and through the passenger seating area. The screen thus is deployed by pivot thereof about a first axis A which corresponds generally to a first edge 30a of the screen. To deploy the screen, the screen is pivoted in a rearward direction to a deployed position where the screen is at an angle θ from horizontal. In the depicted embodiment, θ is within a range of between approximately 45-degrees and 90-degrees. This presents the screen's viewing surface to rear-seat passenger P. The screen also may be retracted to its stowed position, again by pivot of the screen about axis A. Pivot occurs about a hinge which is shown generally at 34.

The screen also is pivotal about a second axis B which is transverse to first axis A. Accordingly, the screen is adjustable by side-to-side rotation of the screen so as to selectively face the screen's viewing surface toward a rear-seat passenger. The screen's viewing surface thus may selectively be placed in the rear-seat passenger's line of sight.

The display unit also employs a locking mechanism which selectively maintains the screen in its stowed position. The locking mechanism includes a catch 52 mounted on the housing and configured to selectively engage a corresponding recess or detent 54 in the screen's second edge 30b. The locking mechanism is operable via a lever 56 which extends (and retracts) the catch for capture (and release) by recess.

Figure 5:
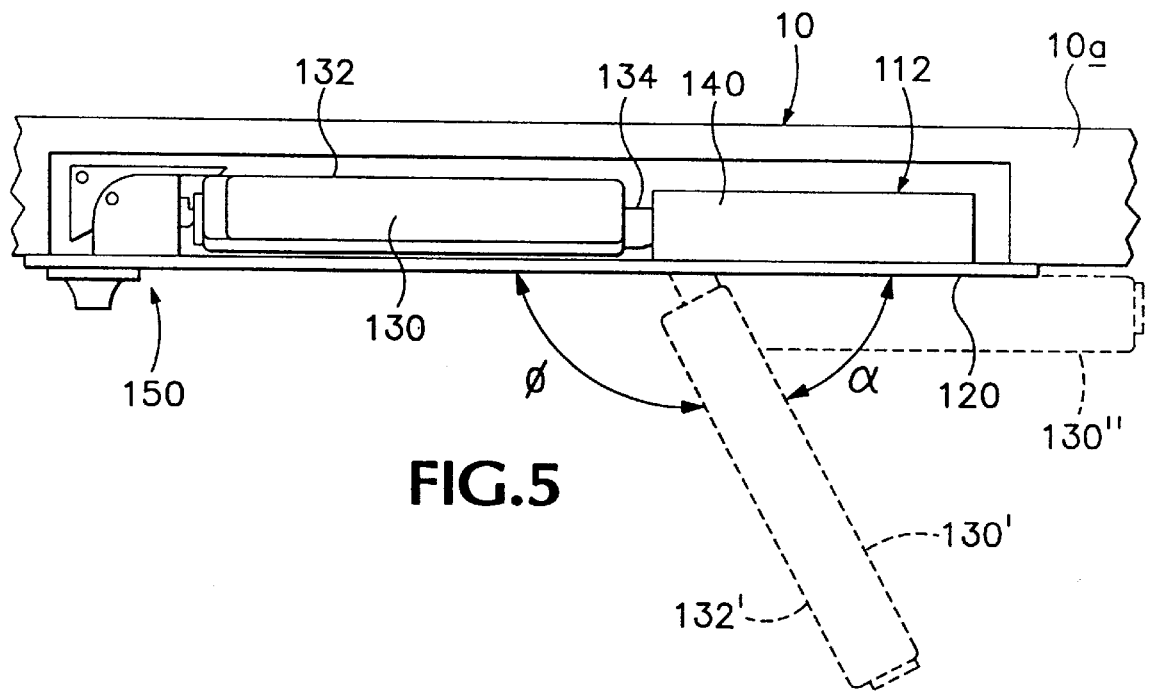
FIG. 5 is a sectional side view of a first alternative embodiment display unit, the display unit screen being shown in successive positions by dashed lines.

A first alternative embodiment display unit is shown at 112 in FIG. 5, the alternative display unit differing from display unit 12 primarily by its provision of a break-away screen 130. The screen is mounted on a display unit housing 120, typically for pivot between a stowed position and a deployed position to present a viewing surface 132 to a passenger in the passenger viewing area.

As indicated, display unit 112 is suited for use in a vehicle 10, the display unit typically being embedded in the vehicle ceiling with housing 120 flush-mounted on ceiling 10a. The screen is hingedly attached to the housing via break-away hinge 134 for pivot between a generally horizontal first orientation wherein the screen is at least partially contained within cavity 124, and a second orientation wherein the screen extends downwardly from the cavity to present the screen's viewing surface to a vehicle occupant for viewing.

In its first orientation (shown in solid lines), screen 130 is in a stowed position where the screen is contained within cavity 124, the screen's viewing surface facing upwardly into the cavity so as to protect the viewing surface from damage. The screen is stowed adjacent control module 140, and may be locked in place by locking mechanism 150.

Upon deployment, the screen is pivoted under a first torque from its first orientation (shown in solid lines at 130) to its second orientation (shown in dashed lines at 130') where the screen is in a deployed position with the screen extending downwardly from the ceiling at an angle α of between approximately 45-degrees and 90-degrees. The screen thus is pivoted though an angle φ which is between approximately 90-degrees and 135-degrees. The screen's viewing surface 132' faces rearwardly and downwardly toward the vehicle's rear-seat passengers.

Upon application of a second, higher torque, the screen may be pivoted from the second orientation (shown in dashed lines at 130') to its third orientation (shown in dashed lines at 130") where the screen rests against the housing in a break-away position. This is accomplished via a two-phase hinge 134 which defines a first range of motion (between the first and second orientations) wherein the screen pivots upon application of a first torque, and a second range of motion (between the second and third orientations) wherein the screen pivots upon application of a higher second torque. As will be appreciated by those skilled in the art, the change in torque creates a soft stop with the screen in the second orientation, a feature which provides for quick deployment of the screen.

The ability of the screen to pivot to the third orientation serves as a safety feature, the screen effectively being configured to collapse in the event of an emergency. It will be understood, for example, that the depicted screen will pivot forward from the second orientation upon contact by a rear-seat passenger who is thrown forward in a collision, but only upon application of a predetermined threshold force. Similarly, the screen is configured to pivot toward the rear of the vehicle upon application of an opposite force. In either event, the screen will yield upon application of sufficient force, and thus will not act as a hard stop of the type which may cause injury to vehicle occupants.

FIGS. 6 through 9 show a second alternative embodiment of the invented display unit at 212, such display unit being adapted for use in a vehicle having a sunroof or the like. It will be noted that the display unit includes a surface-mounted housing 220. The housing defines a cavity 224 which is configured to house a screen 230 having a viewing surface 232. The screen may be deployed to reveal the viewing surface, typically first by translation in a plane defined by the screen, and second by pivot about an axis defined by hinge 234. The screen thus typically is mounted on a carriage 236 for translation along a track 238. The hinge is positioned along a predetermined edge of the screen to provide for pivot of the screen once it has been removed from the cavity.

Figure 6:
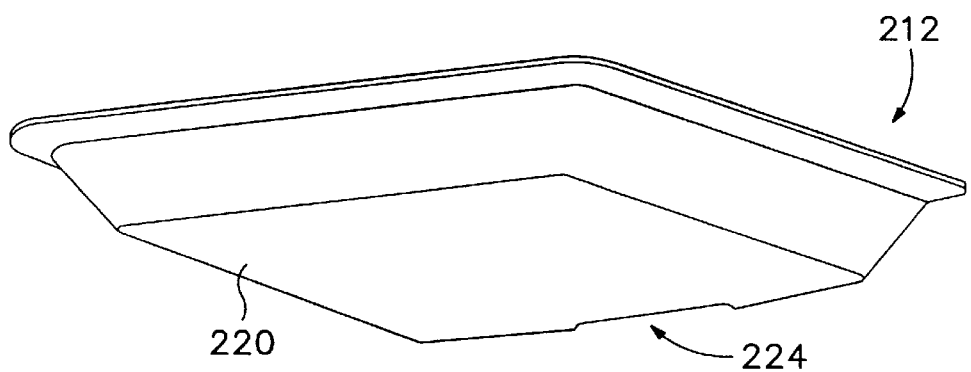
FIG. 6 is an isometric view of a second alternative embodiment display unit, the display unit including a screen in a stowed position.
Figure 7:
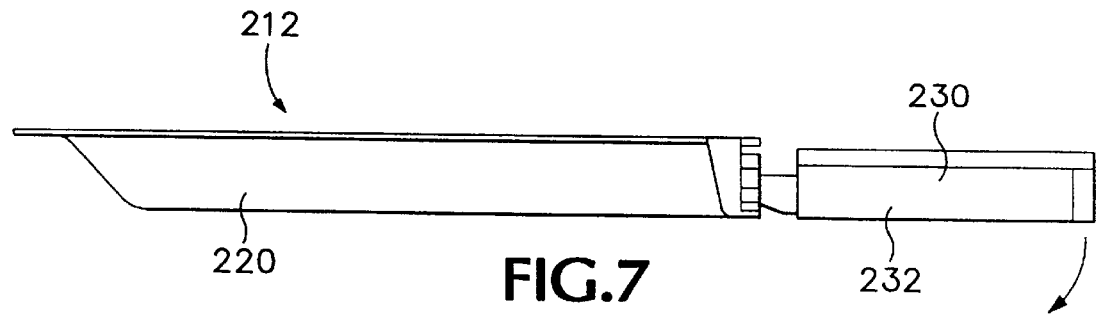
FIG. 7 is a side view of the display unit of FIG. 6, but with the screen in an intermediate position.
Figure 8:
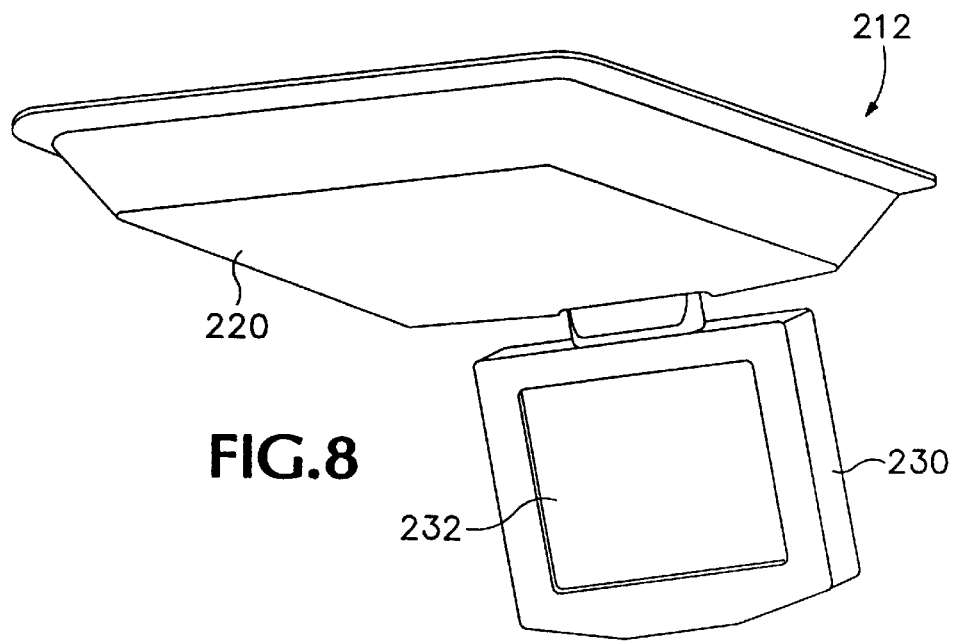
FIG. 8 is an isometric view of the display unit of FIG. 6, but with the screen in a deployed position.
Figure 9:
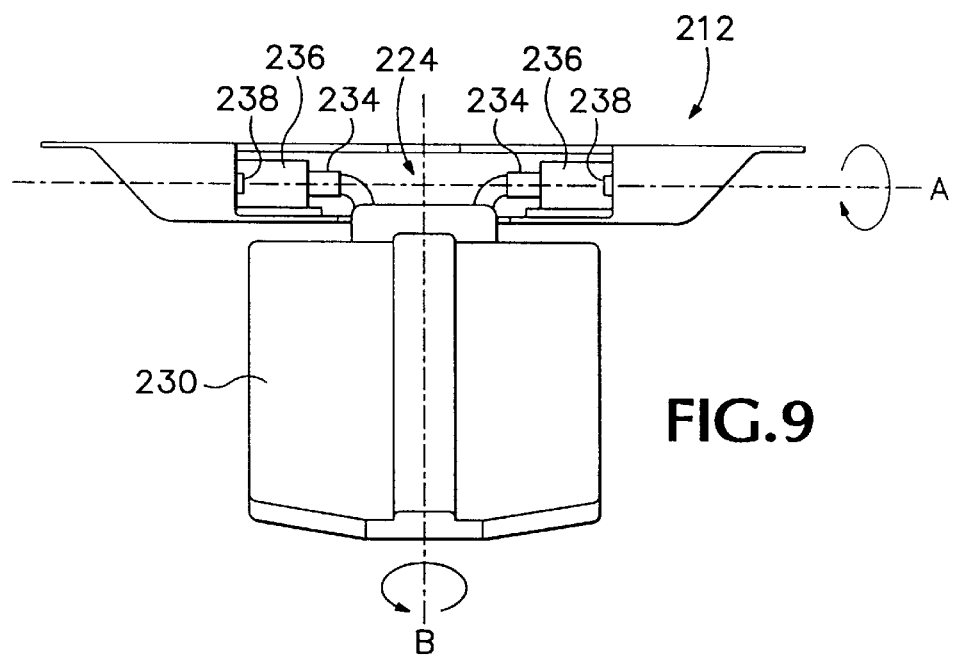
FIG. 9 is an end view of the display unit of FIG. 6, the screen being deployed to reveal a track, carriage and hinge arrangement for use in deploying the screen.

In FIG. 6, the screen is shown in its first position where the screen is contained within the cavity in a generally horizontal orientation. From the first position, the screen is translated along track 236 to an intermediate position with the screen still in the generally horizontal orientation. FIG. 7 shows the screen in the intermediate position. Thereafter, the screen is pivoted about a first axis A to a second position where the screen extends downwardly from the cavity to present the screen to a vehicle occupant for viewing. FIG. 8 shows the screen in the second position. The screen also may be rotatable about a second axis B which is transverse to the first axis.

The screen is configured to pass forwardly in the vehicle along track 236, and then to pivot rearwardly to the deployed orientation under a predetermined first torque. The screen typically will pivot downstream to an angle of between approximately 45-degrees and 90-degrees from horizontal such that the viewing surface may be readily seen by rear-seat passengers. It is possible, however, to provide for further downstream pivot of the screen under a higher second torque to provide for emergency collapse of the screen.

While the present invention has been shown and described with reference to the foregoing operational principles and preferred embodiment, it will be apparent to those skilled in the art that other changes in form and detail may be made therein without departing from the spirit and scope of the invention as defined in the appended claims.

I claim:

1. In an automobile having a passenger seating area and a generally planar ceiling, an above-seat-level, ceiling-mounted display unit comprising:

a generally planar mounting frame structure joined with the ceiling in a location overhead and generally forward of the passenger seating area in the automobile, the mounting frame structure being joined generally co-planarly with the ceiling and having a proximal portion closer to the passenger seating area and distal portion more remote from the passenger seating area;

a generally planar screen structure hinged to the mounting frame structure adjacent the distal portion thereof for reversibly swaying in an upright plane, extending both through the mounting frame structure and the passenger seating area, between a stowed position wherein the screen structure lies in a plane generally paralleling the plane of the mounting frame structure and a deployed position wherein the screen structure occupies a generally upright plane which lies at an angle relative to the plane of the mounting-frame structure with a disposition overhead-viewable by any passenger seated in the passenger seating area; and wherein the display unit has a thickness of less than 1.5 inches.

2. An overhead automotive display unit, the display unit comprising:

an automotive-ceiling-mounted housing defining a cavity of a shape and size; and a screen sized to fit at least partially within the cavity, the screen having a viewing surface and being mounted on the housing for pivotal movement about a first axis extending generally parallel to an edge of the screen between a stowed position wherein the screen is at least partially contained within the cavity of the housing, and a deployed position wherein the screen pivotally projects from the cavity of the housing to present the viewing surface to an automobile occupant, wherein the display unit has a thickness of less than 1.5 inches.

3. The display unit of claim 2, wherein the display unit has a thickness of between approximately 0.5 inches and approximately 1.5 inches.

4. The display unit of claim 2, wherein the vehicle includes a ceiling and the display unit is mounted on the ceiling of the vehicle.

5. The display unit of claim 4, wherein the display unit is embedded in the ceiling of the vehicle.

6. The display unit of claim 4, wherein the housing includes a perimeter structure with a flange configured for placement against the ceiling to define a cavity opening, the screen being mounted on the housing such that the viewing surface lies generally flush with the flange when the screen is in the stowed position.

7. The display unit of claim 4, wherein the viewing surface defines a plane generally parallel to the ceiling when the screen is in the stowed position.

8. The display unit of claim 2, wherein the display unit further comprises a control module mounted separately from the screen, the control module being operatively connected to the screen to direct operation of the screen.

9. The display unit of claim 8, wherein the control module is mounted within the housing.

10. The display unit of claim 8, wherein the control module is mounted on the housing in a laterally spaced relationship to the screen.

11. The display unit of claim 10, wherein the control module and the screen extend in the same plane when the screen is in the stowed position.

12. The automotive display unit of claim 2, wherein the screen includes a hinge pivotally coupling the screen with the housing, the screen being pivotal about the hinge between the stowed position and the deployed position under a first torque to provide for deployment of the screen, and being pivotal between the deployed position and a break-away position under a higher second torque to provide for emergency collapse of the screen.

13. The display unit of claim 12, wherein the screen is adapted to pivot forwardly in the vehicle from the stowed position to the deployed position, and further adapted to pivot forwardly in the vehicle from the deployed position to the break-away position.

14. The display unit of claim 12, wherein the deployed position is generally between the stowed and the break-away positions.

15. The display unit of claim 12, wherein the vehicle includes a ceiling and the viewing surface defines a plane extending generally parallel to the ceiling when the screen is in the stowed position.

16. The display unit of claim 12, wherein the vehicle includes a ceiling and the viewing surface defines a plane extending generally parallel to the ceiling when the screen is in the breakaway position.

17. The display unit of claim 2, wherein the screen is completely received within the cavity when the screen is in the stowed position.

18. The display unit of claim 2, wherein the viewing surface is oriented to face the cavity when the screen is in the stowed position.

19. The display unit of claim 2, wherein the viewing surface is oriented to face out of the cavity when the screen is in the stowed position.

20. The display unit of claim 2, further comprising a hinge pivotally coupling the screen to the housing, wherein the hinge includes a stop that retains the screen in the deployed position until urged away from the deployed position.

21. The display unit of claim 2, further includes a locking mechanism adapted to retain the screen in the stowed position.

22. The display unit of claim 21, wherein release of the lock mechanism frees the screen to pivot away from the stowed position, and further wherein the screen is adapted to automatically pivot at least partially away from the stowed position when the lock mechanism is released.

23. The display unit of claim 21, wherein the locking mechanism further includes a catch on the housing positioned to selectively engage a detent in the screen to maintain the screen in the stowed position.

24. The display unit of claim 23, wherein the screen further includes an edge extending generally transverse to the viewing surface, and the catch is on the edge.

25. The display unit of claim 23, wherein the screen further includes an edge extending generally transverse to the viewing surface, and the detent extends inwardly into the screen from the edge.

26. The display unit of claim 2, wherein the screen is rotatable about a second axis transverse to the first axis.

27. The display unit of claim 26, wherein the first axis extends along the edge.

28. The display unit of claim 2, wherein the screen is sized to be of the size and shape of the cavity.

\* \* \* \* \*

UNITED STATES PATENT AND TRADEMARK OFFICE
CERTIFICATE OF CORRECTION

PATENT NO. : 5,946,055
DATED : August 31, 1999
INVENTOR(S) : John B. Rosen

It is certified that error appears in the above-identified patent and that said Letters Patent is hereby corrected as shown below:

<u>Title page,</u>
Insert the following priority claim:

Related U.S. Application Data

[60] -- This application is a continuation-in-part of U.S. Patent Application Serial No. 29/058,538, filed August 16, 1996, which issued October 6, 1998 as U.S. Patent No. Des. 399,200. --

Signed and Sealed this

Twenty-eighth Day of September, 2004

JON W. DUDAS
*Director of the United States Patent and Trademark Office*